United States Patent [19]
Silverbrook et al.

[11] Patent Number: 6,124,863
[45] Date of Patent: Sep. 26, 2000

[54] OBJECT-BASED GRAPHICS SYSTEM FOR DISPLAYING AN IMAGE USING EXPLICIT QUADRATIC POLYNOMIAL FRAGMENTS

[75] Inventors: Kia Silverbrook, Woollahra; David William Funk, Meadowbank; Simon Robert Walmsley, Epping, all of Australia

[73] Assignees: Canon Kabushiki Kaisha, Tokyo; Canon Information Systems Research Australia Pty Limited, Australia

[21] Appl. No.: 08/053,219

[22] Filed: Apr. 28, 1993

[30] Foreign Application Priority Data

Apr. 29, 1992 [AU] Australia .................................. PL2150

[51] Int. Cl.$^7$ .................................................. G06T 11/20
[52] U.S. Cl. ............................................................ 345/442
[58] Field of Search ...................................... 395/136, 152, 395/133, 150, 151, 140–143; 345/143, 144, 436, 440–443; 364/718, 720, 721

[56] References Cited

U.S. PATENT DOCUMENTS

| | | | |
|---|---|---|---|
| 4,949,281 | 8/1990 | Hillenbrand et al. | 395/142 |
| 5,115,479 | 5/1992 | Murayama | 395/142 |

FOREIGN PATENT DOCUMENTS

| | | |
|---|---|---|
| 4000021 | 7/1991 | Germany . |

OTHER PUBLICATIONS

Schumaker, "On Shape Preserving Quadratic Spline Interpolation", *Siam J. Numer. Anal.*, V. 20, N. 4, pp. 854–864, Aug. 1983.

Pavlidis, "Curve Fitting with Conic Splines", *ACM Trans. on Graphics*, V. 2, N. 1, pp. 1–31, Jan. 1983.

Pratt, "Techniques for Conic Splines", *Computer Graphics*, V. 19, N. 3, pp. 151–159, Jul. 1985.

Fenyves et al., "On Quadratic Splines and Their CAD–Application", *Proc. of 4$^{th}$ Intl. Conf. on Engineering Software*, pp. 14–37 to 14–45, Jun. 1985.

Pavlidis, "Scan Conversion of Regions Bounded by Parabolic Splines", *IEEE CG&A*, pp. 47–53, Jun. 1985.

Van Aken et al., "Curve–Drawing Algorithms for Raster Displays", *ACM Trans. on Graphics*, V. 4, N. 2, pp. 147–169, Apr. 1985.

Pitteway, "Algorithm for Drawing Ellipses or Hyperbolae with a Digital Plotter", *Computer Journal*, V. 10, N. 3, pp. 282–289, Jan. 1967.

Schmidt et al., "Quadratic and Related Exponential Splines in Shape Preserving Interpolation", *J. of Computational and Applied Mathematics*, V. 18, pp. 321–329, Jan. 1987.

Barsky, "An Intuitive Description of Parametric Splines in Computer Graphics," *Graphics Interface '90*, pp. 252–266, Jun. 1990.

Kammerer et al., "Quadratic Interpolatory Splines", *Numerische Mathematik*, V. 22, pp. 241–259, Sep. 1974.

Sharma et al., "Quadratic Splines", *J. of Approximation Theory*, V. 19, N. 1, pp. 186–193, Jan. 1977.

(List continued on next page.)

*Primary Examiner*—Joseph H. Feild
*Attorney, Agent, or Firm*—Fitzpatrick, Cella, Harper & Scinto

[57] ABSTRACT

An object-based computerized graphics system for reproducing an image on a display device having a plurality of scan lines upon each of which a plurality of pixels are reproducible. The system includes information-providing means for providing graphic object information for at least one graphic object intended for reproduction, the graphic object comprising an outline representation of the graphic object. The outline representation is formed from at least two curve fragments, each curve fragment being defined by a single non-parametric quadratic polynomial. Also included in the system is rendering means for rendering the at least one graphic object. The rendering means is configured to determine, for each curve fragment, a first intersection between each curve fragment and a scan line of the display device. The rendering means is also used to determines using two computer-implemented mathematical operations, each subsequent intersection between each curve fragment and other ones of the scan lines.

29 Claims, 9 Drawing Sheets

OTHER PUBLICATIONS

Auerbach et al., "Approximation and Geometric Modeling with Simplex B–Splines Associated with Irregular Triangles", *Computer Aided Geometric Design*, V. 8, pp. 67–87, Jan. 1991.

Van Aken, "An Efficient Ellipse–Drawing Algorithm", *IEEE CG&A*, pp. 24–35, Sep. 1984.

Kappel, "An Ellipse–Drawing Algorithm for Raster Displays," *Fundamental Algorithms for Computer Graphics*, (Earnshaw ed.), Springer–Verlag, 1985.

Pregl, "Algorithms for Computing Conic Splines", *J. of Computing in Civil Engineering*, V. 4, N. 1, pp. 180–199, Jan. 1990.

Neamtu, "On Discrete Simplex Splines and Subdivision", Memorandum No. 860, NTIS, ISSN 0169–2690, pp. 1–44, May 1990.

Lam, "Investigations into the Shape–Preserving Interpolants Using Symbolic Computation", NASA Research Grant NAG–1–760, pp. 1–16, Oct. 1988.

Traas, "Practice of Bivariate Quadratic Simplicial Splines," NTIS Tech. Report, Memorandum 800, pp. 1–40, Jul. 1989.

Chui et al., "Bivariate $C^1$ Quadratic Finite Elements and Vertex Splines", *Mathematics of Computation*, V. 54, N. 189, pp. 169–187, Jan. 1990.

Cohen, "Incremental Methods for Computer Graphics", ARPA Order No. 952, ESD–TR–69–193, Apr. 1969.

James D. Foldy, et al., Computer Graphics: Principles and Practice, Second Edition, pp. 96–100, 1990.

Hornbeck, *Numerical Methods*, pp. 7–61 (1975).

Foley, James D., et al., "Computer Graphics: Principles And Practice" 2nd Ed., pp. 478–483 (Nov. 1992).

"Automatic Curve Fitting With Quadratic B–Spline Functions And Its Application To Computer–Assisted Animation", Yang, et al., Computer Vision, Graphics And Image Processing, vol. 33, No. 3, Mar. 1986, pp. 346–363.

"Computer Graphics: Principles 1–13 And Practice (Second Edition)", Addison–Wesley, Foley, et al., Section 11.2, pp. 478–516.

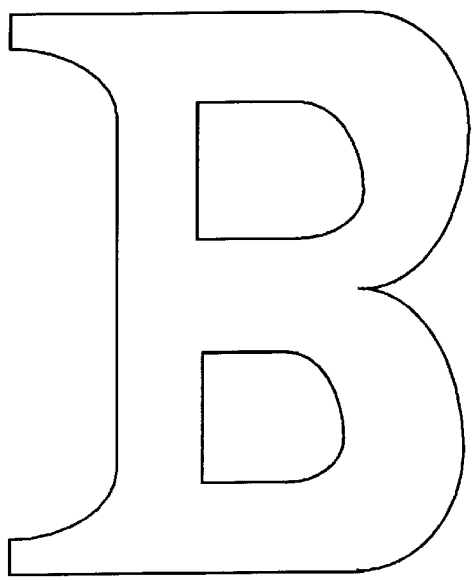
Fig. 15
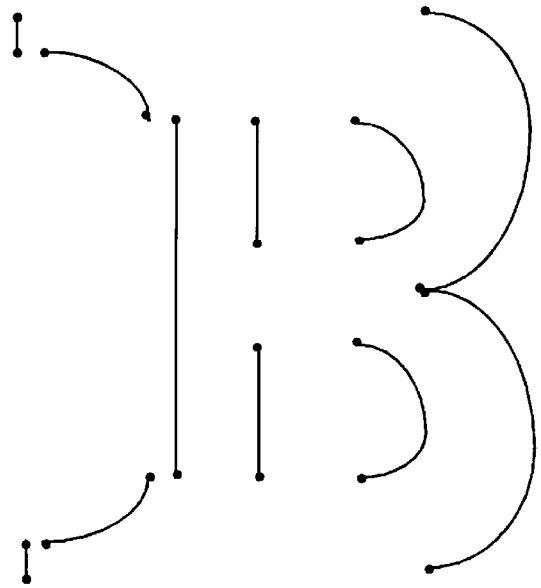
Fig. 16
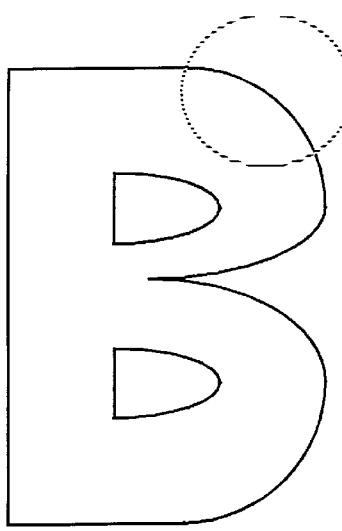
Fig. 17
Fig. 18
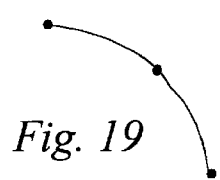
Fig. 19

6,124,863

OBJECT-BASED GRAPHICS SYSTEM FOR DISPLAYING AN IMAGE USING EXPLICIT QUADRATIC POLYNOMIAL FRAGMENTS

BACKGROUND

1. Field of the Invention

The present invention relates to object graphics and, in particular, discloses a means by which objects can be described and manipulated by dividing each object into a number of fragments and mathematically describing each fragment by a quadratic polynomial.

2. Description of the Related Art

Most object graphics systems use a frame store to hold a pixel based image of the page or screen. The outlines of individual objects are calculated, filled and written into the frame store. For two dimensional graphics, objects which appear in front of other objects are simply written into the frame store after the background object, thereby replacing the background on a pixel by pixel basis. Such systems are typically expensive in terms of hardware and the time taken to create a full page image.

Real time image generation for raster displays can be achieved by calculating the image in raster order. This means that each scan line must be calculated as it is encountered. This requires that the intersection points of each scan line with each object outline are calculated and then filled.

Traditionally, the calculation of intersections of outlines are performed using straight line or spline formats. The most popular spline formats are various forms of parametric cubic polynomials, such as Bezier curves. If cubic Bezier splines are used, intersection calculation involves calculating the roots of a cubic polynomial at a particular scan line to obtain the parametric positions of the intersections, and substituting these into the polynomial to obtain the actual pixel intersections. Whilst it is possible to build hardware to perform this function in real time, such hardware is highly complex and not suited for consumer priced equipment.

SUMMARY OF THE INVENTION

It is an object of the present invention to provide an alternative to the above through provision of a simplified format for representing object outline data which can be readily and quickly manipulated within an object based graphics system.

In accordance with one aspect of the present invention there is disclosed an object based graphics system characterised by the representation of objects by quadratic polynomials.

In accordance with another aspect of the present invention there is disclosed an object based graphics system in which individual objects are represented by a plurality of curve fragments in which each curve fragment is defined by a quadratic polynomial.

In accordance with a further aspect of the present invention there is disclosed an object based graphics system wherein each object is divided into a plurality of curve fragments each being defined by a START_PIXEL location, a ΔPIXEL value, a ΔΔPIXEL value, a START_LINE, and an END_LINE wherein the pixel location of said curve fragment on any line$_{(n)}$ of the displayed image is given by:

$$\text{PIXEL (line}_{n+1}) = \text{PIXEL (line}_n) + \Delta\text{PIXEL (line}_n)$$

$$\Delta\text{PIXEL (line}_{n+1}) = \Delta\text{PIXEL (line}_n) + \Delta\Delta\text{PIXEL}$$

where

PIXEL (line$_{n=START\_LINE}$)=START_PIXEL; and

ΔPIXEL (line$_{n=START\_LINE}$)=ΔPIXEL.

In accordance with a further aspect of the present invention there is disclosed an object based graphics system characterised in that each intersection between an object outline and a scan line can be calculated by two mathematical operations, when the previous intersection is known. Preferably, the mathematical operations are additions.

BRIEF DESCRIPTION OF THE DRAWINGS

A preferred embodiment of the present invention will now be described with reference to the drawings in which:

FIGS. 15 to 19 shows examples of QPF formation for a single object.

DETAILED DESCRIPTION OF THE PREFERRED EMBODIMENT

Figure 1:
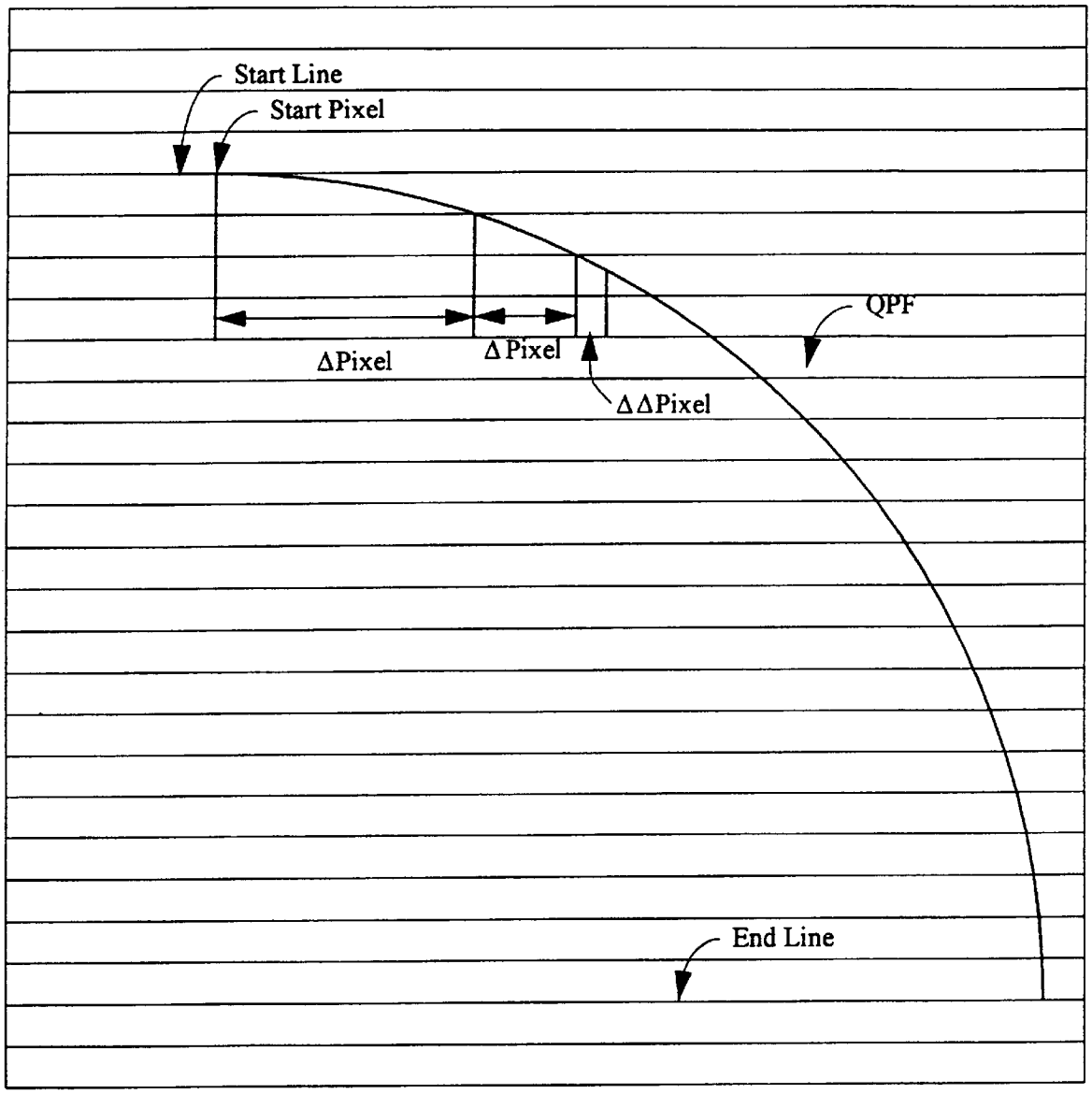
FIG. 1 illustrates a single quadratic polynomial fragment (QPF)

Referring to FIG. 1, a quadratic polynomial fragment QPF which forms part of an object outline is illustrated extending from a start line to an end line within a raster display. The QPF is a curve characterised by a constant change in slope of the line and in this manner, each fragment of any object outline can be described using a quadratic polynomial.

Because each QPF changes slope in a constant manner along its length, each QPF can be readily defined by a number of parameters.

The first of these parameters is the START_LINE which specifies the first line in raster order upon which the QPF appears.

The next parameter is the START_PIXEL which specifies the pixel value (i.e. location) of the QPF on the start line.

The next parameter is ΔPIXEL which specifies the slope of the line. ΔPIXEL is added to start pixel for each raster line of the display.

The next parameter is ΔΔPIXEL which specifies the curvature of the line, ΔΔPIXEL is added to ΔPIXEL each raster line.

The last parameter is the END_LINE which specifies the last line on which the QPF appears.

With the foregoing parameters, the pixel locations on each of the scan (raster) lines of the QPF can be determined in the following manner:

PIXEL (line$_{n+1}$)=PIXEL (line$_n$)+ΔPIXEL (line$_n$)

ΔPIXEL (line$_{n+1}$)=ΔPIXEL (line$_n$)+ΔΔPIXEL where

PIXEL (line$_{n=START\_LINE}$)=START_PIXEL; and

ΔPIXEL (line$_{n=START\_LINE}$)=ΔPIXEL.

Turning now to FIGS. 2–7, there are shown a number of individual objects each of which being defined by a plurality of QPF's.

Figure 2:
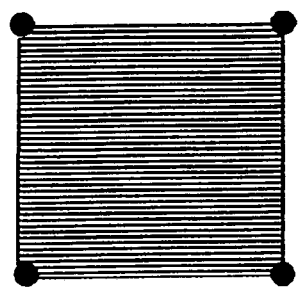
FIG. 2 illustrates an object formed by two QPFs.

In FIG. 2, a square object is shown defined by two QPFs which define the left and right sides of the square respectively. Each QPF commences on a common start line and ends on a common end line. In this manner, the QPFs of the square define the boundaries at which particular pixel value (such as a colour) can be asserted so as to display the square.

Figure 3:
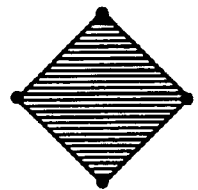
FIG. 3 illustrates an object formed by four QPFs.

In FIG. 3, a lozenge-shaped object is shown which is defined by four QPFs in which the end line for one QPF represents the start line for the next, adjacent QPF.

It is apparent from FIGS. 2 and 3, that is it not possible for a QPF to be aligned with a scan line which would imply infinite slope in, for example, the embodiment shown in FIG. 1.

Figure 4:
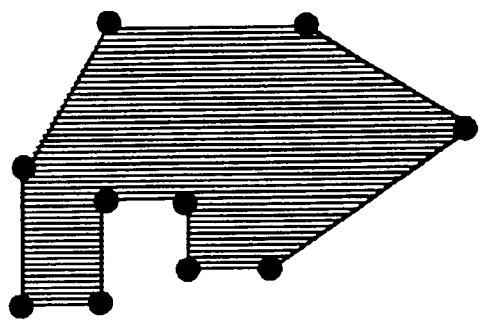
FIG. 4 illustrates an object formed by six QPFs.
Figure 5:
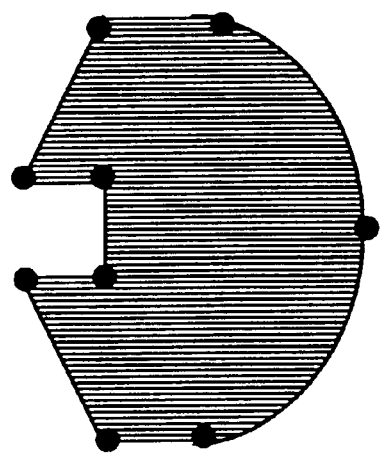
FIG. 5 illustrates an object formed by five QPFs.
Figure 6:
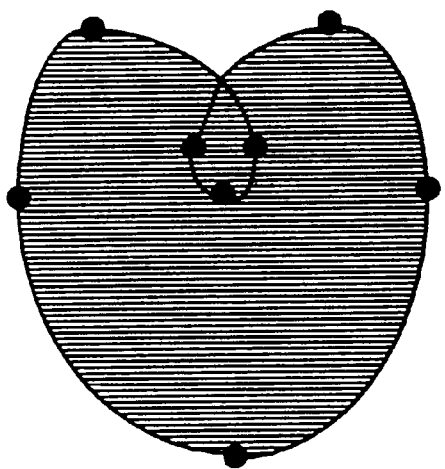
FIG. 6 illustrates an object formed by eight QPFs.
Figure 7:
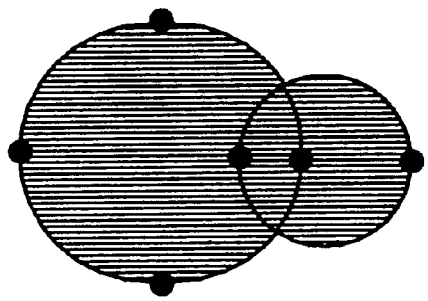
FIG. 7 illustrates another object formed by eight QPFs.

FIG. 4 shows an alternative object formed by six QPFs. Those QPFs that appear vertical (perpendicular to the scan lines) have ΔPIXEL=0 and ΔΔPIXEL=0. Where a QPF has a constant (linear) slope, ΔPIXEL is non-zero and ΔΔPIXEL equals 0.

The QPF format described herein has specific application in real time object graphics and is useful in a system such as that disclosed in U.S. patent application Ser. No. 08/053,373, filed Apr. 28, 1993, U.S. Pat. No. 5,444,839, entitled "A Real Time Object Based Graphic System", claiming priority from Australian Patent Application PL2147, filed Apr. 29, 1992 and the disclosure of which is hereby incorporated by reference.

Figure 8:
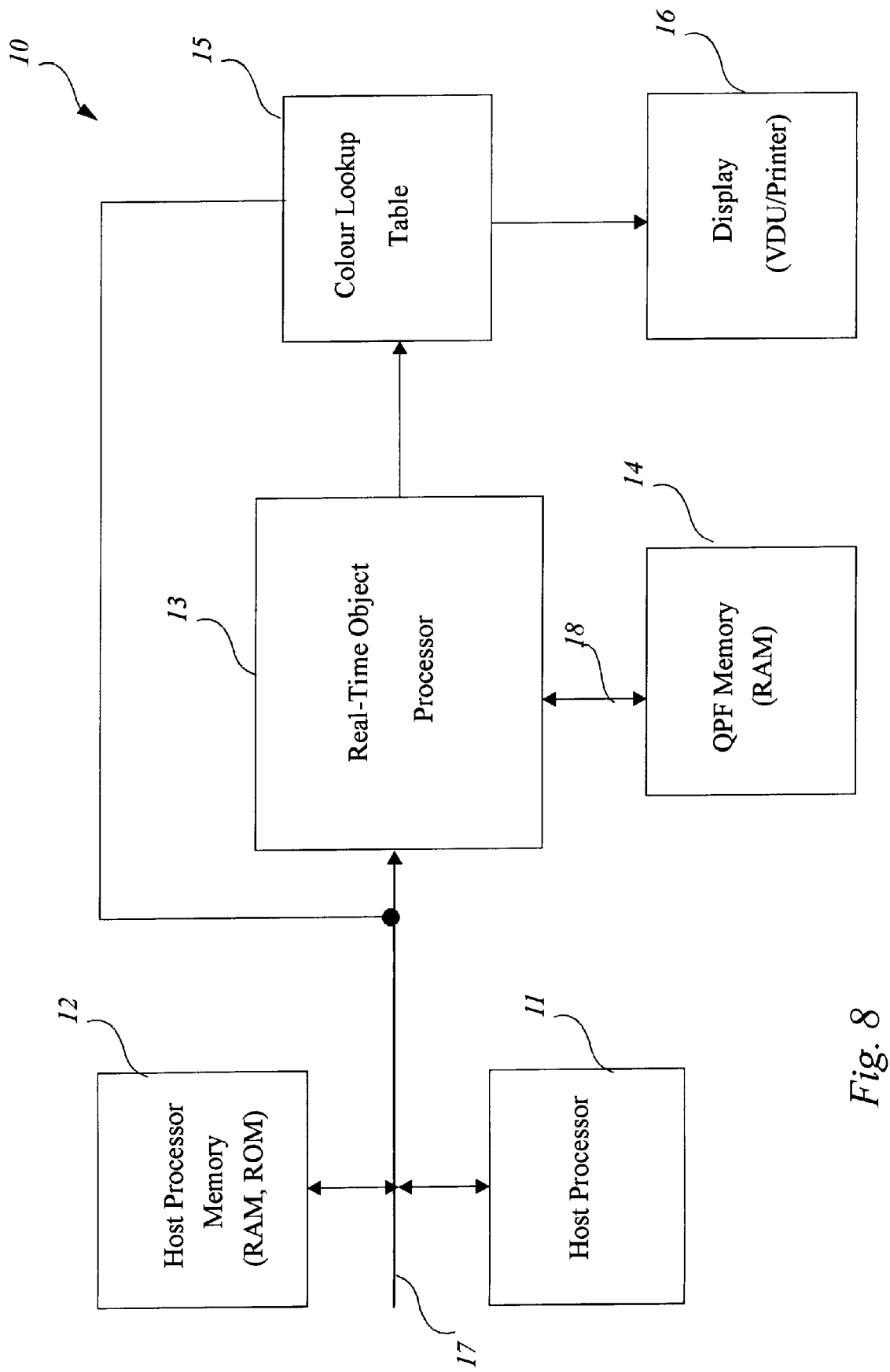
FIG. 8 is a schematic block diagram representation of an object based graphic system which utilises QPFs.

Turning now to FIG. 8, such a real time object (RTO) graphics system is shown which includes a controlling processor 11 connected via a processor bus 17 to a processor memory 12 which includes ROM and RAM. The processor 11 operates to form a page display list of objects which are used to form an image. The page display list is stored in the RAM portion of the processor memory 12 in which the objects can be derived from the ROM portion of the processor memory 12 or alternatively input to the system 10 via any known external means such as a disc drive, a digitising tablet of a graphics work station or the like.

Connected to the processor bus 17 is a RTO processor 13 which manipulates QPFs of objects in the page display list so as to output rasterised image data to a colour lookup table 15 for reproduction on a display 16 such as a video display unit or printer. The RTO processor 13 also connects via a QPF bus 18 to a QPF memory 14 formed of static RAM which is used for the storage of QPFs whilst the processor 13 is calculating the image data.

Accordingly, because the processor 13 can only accept QPFs, the objects which form the page display list produced by the processor 11 must also be described as QPFs.

Where the processor 11 and preformated objects are configured using cubic polynomials such as Bezier splines, these polynomials can be converted to QPFs in the manner described in U.S. patent application Ser. No. 08/053,213, filed Apr. 28, 1993, U.S. Pat. No. 5,422,990, entitled "Bezier Spline to Quadratic Polynomial Fragment Conversion", claiming priority from Australian Patent Application PL2149, filed Apr. 29, 1992 and the disclosure of which is hereby incorporated by reference.

Figure 9:
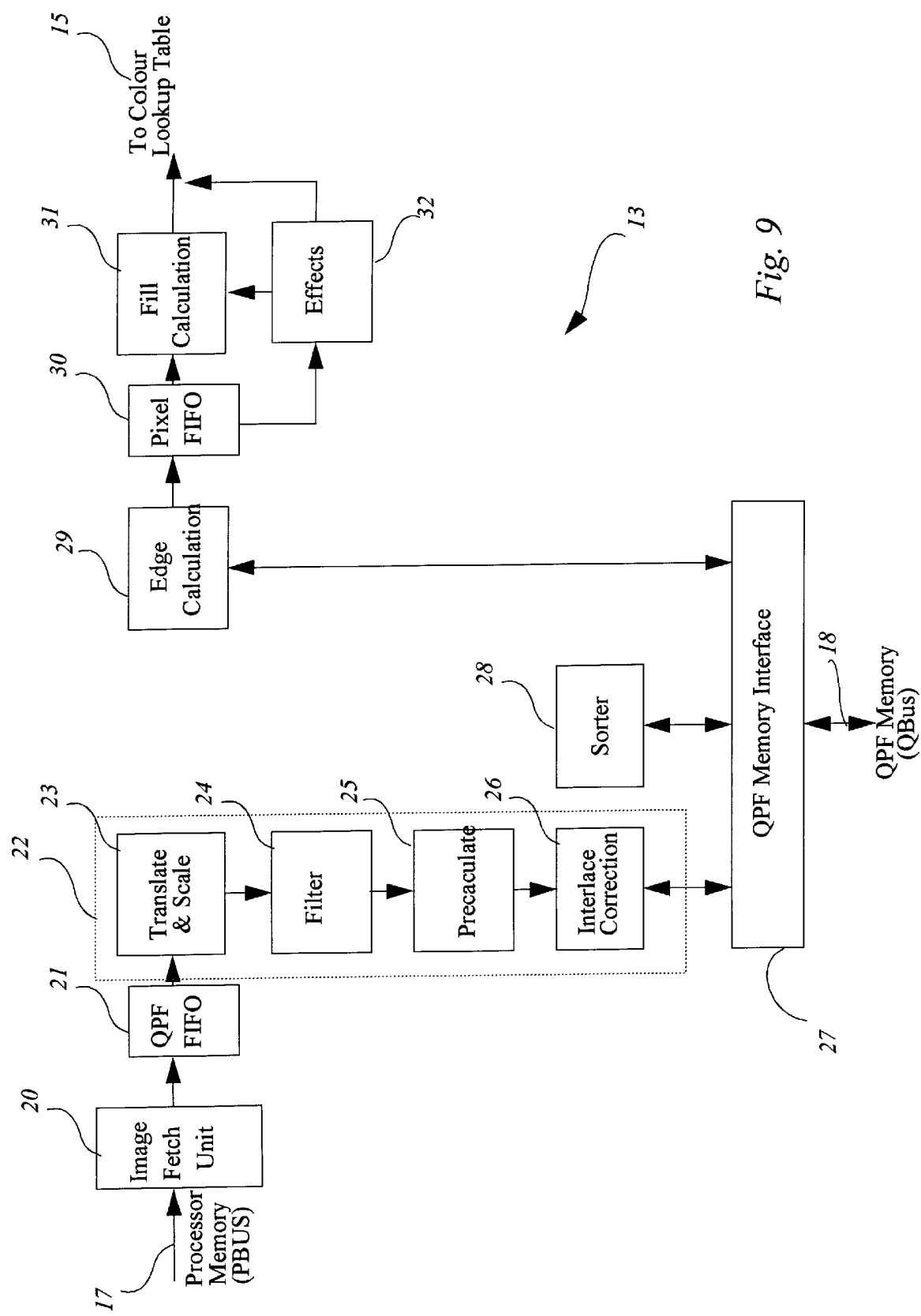
FIG. 9 is a data flow diagram of the real time object (RTO) processor of FIG. 8 which indicates those operations occurring on the QPFs.

Referring now to FIG. 9, the data flow diagram of the RTO processor 13 shows an image fetch unit 20 connected to the processor memory 12 via the bus 17. Objects and their QPFs are fetched from the memory 12 by the unit 20 and are output to a QPF first-in-first-out (FIFO) register 21 which is four words deep. Data in the FIFO 21 is tagged as object or QPF data as per the formats of FIGS. 11 and 12 to be later described. The FIFO 21 is used to decouple fetching from data processing, so as to increase the access efficiency to the processor bus 17 and the calculated efficiency.

Data is output from the FIFO 21 into a preprocessing pipeline 22 which performs a series of calculations on the data before it is stored in the QPF RAM 14. These operations are:

(23) applying scaling and translation factors for the current object to each QPF:

(24) filtering out QPF's which will not effect the display;

(25) iteratively recalculating the values in a QPF which start before the first line of the display, to yield a QPF starting on the first line of the display; and

(26) applying a correction to the QPF's rendering if the image is to be interlaced (as, for example, on a television display).

From the preprocessing pipeline 22, the QPFs are stored in the QPF memory 14. The QPF data is stored as a series of linked lists, one for each line in the image to be formed. After all of the QPFs in the image have been fetched and stored in the memory 14, the linked list for each line is sorted by a sorter 28 in order of pixel value (i.e. position), in preparation for rendering of the image to the display 16.

In video applications, image preparation of the new image occurs in one half of a double buffered QPF memory, whilst the other half is used for rendering. However, the QPF memory 18 is single ported, so the image preparation and image rendering sections of the processor 13 must compete for access to the bus 18.

Image rendering is commenced in synchronization with the display 16. Rendering consists of calculating the intersection of QPFs with each line on display 16 in turn, where these intersections define the edges of objects. Each edge (or intersection) is used in the calculation of the level which is to be displayed at a particular pixel position on the scan line.

For each line in the image, the render process steps through the list of QPFs for that line, executing the following steps:

copy the pixel value (location), pixel level (colour) and effects information into a pixel FIFO 30 to be picked up for fill generation and calculation;

calculate the values of the QPFs intersection for the next line, or discard QPFs which terminate on the next line; and merge the recalculated QPF into the list of QPF's starting on the next line.

Rendering and recalculation has the highest priority on the QPF bus 18, however the bus 18 is freed from storage or sorting access whenever the pixel FIFO 30 is filled, or all the QPFs for the current line have been processed.

Data is sequenced out of the pixel FIFO 30, which is sixteen words deep, under the control of a pixel counter which is incremented by each pixel clock cycle derived from the display 16. The fill generator 31 resolves the priority levels of the objects in the display, and outputs the highest visible level at each pixel position to the colour lookup table 15 prior to display. The fill generation can be modified by an effects block 32, so as to implement visual effects such as transparency.

Figure 10:
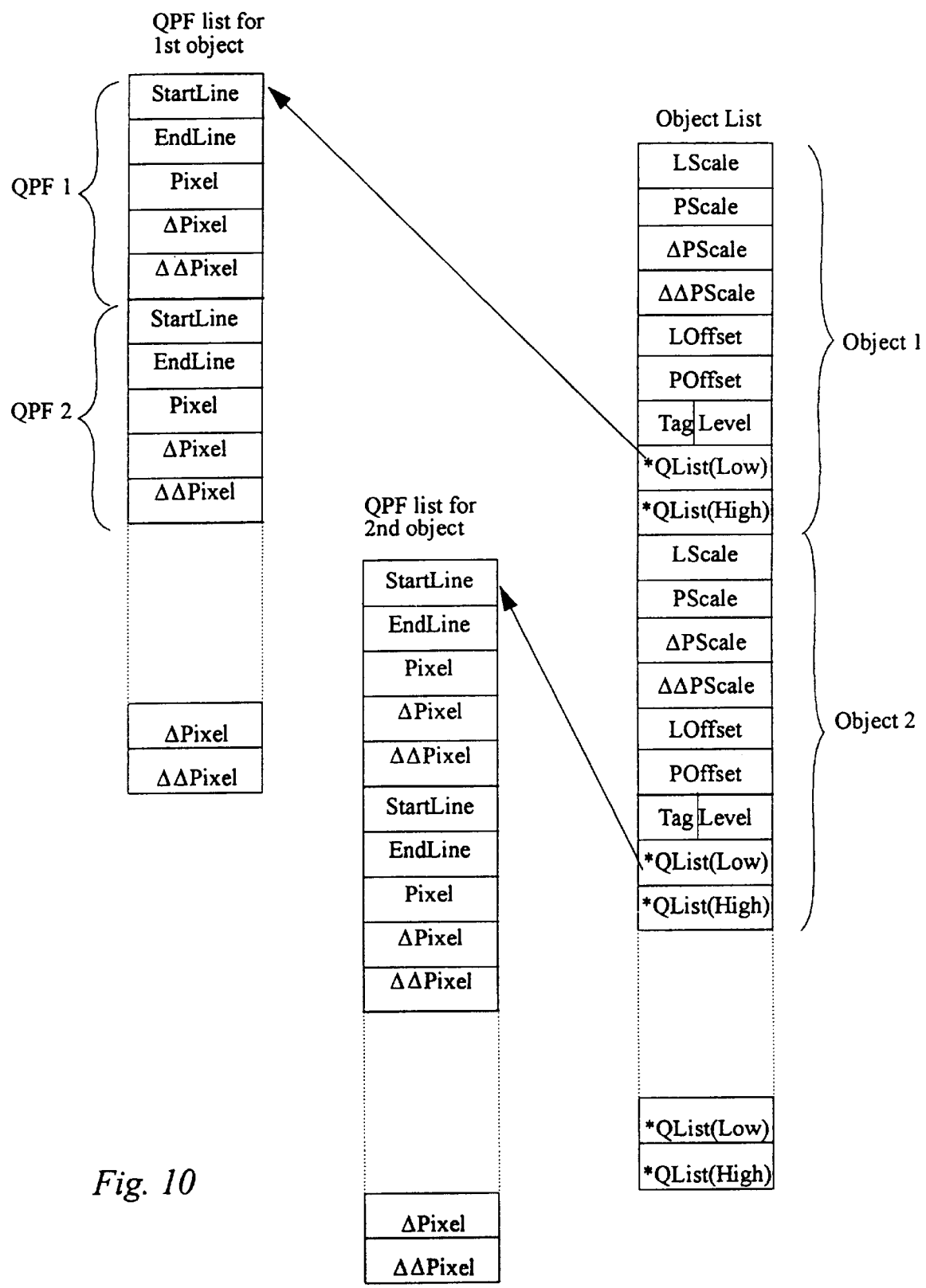
FIG. 10 shows an object list and the configuration of QPFs for each object in the list.

The organisation of the data making up an image in the processor memory 12 is shown in FIG. 10. This shows one object list, although there may be many such lists, each in the format shown.

In the preferred embodiment of the graphics system 10, the objects in the list are placed contiguously in memory, with each object (Object 1, Object 2, . . . ) occupying nine 16 bit locations. The last two words of each object are *QList(low) and *QList(high) which form a pointer to the start of the QPF list for that particular object. The QPF list can reside anywhere in the memory 12. The remainder of the object description is made up of scaling and translation factors (LScale, PScale, ΔPScale, ΔΔPScale, LOffset and POffset), the object's level (6 bits) and effects (2 bits) bits (Level), and an eight-bit object tag (Tag)

LOffset represents a palette of colours from which Level selects the actual colour of the object. In this manner, Level and LOffset can address 24 bit colour data permitting over 16 million colours to be displayed using the system 10. Although the RTO processor 13 only manipulates Level, the colour look-up table 15 also has access to the processor bus 17 whereby the processor 11 can adjust the particular palette. By writing to the colour look-up table 15 to display the appropriate colour for that object.

POffset represents a pixel translation amount (X translation for video display)

LOffset represents a line translation amount (Y translation for video).

LScale represents a line scaling factor (related to Y size).

PScale represents a pixel scaling factor (related to X size).

ΔPScale represents a pre-calculated factor for scaling ΔPIXEL to give an equivalent X size as PScale.

ΔΔPScale represents a pre-calculated factor for scaling ΔΔPIXEL to give equivalent X size as PScale.

For each object, the QPFs are listed contiguously in memory, each QPF being made up of five 16 bit words. These are, as described earlier, (in order) the START_LINE, the END_LINE, the START_PIXEL, the ΔPIXEL, and the ΔΔPIXEL. Both object and QPF lists in the processor memory 12 must contain at least one item, as there is no provision for a null list.

Figure 11:
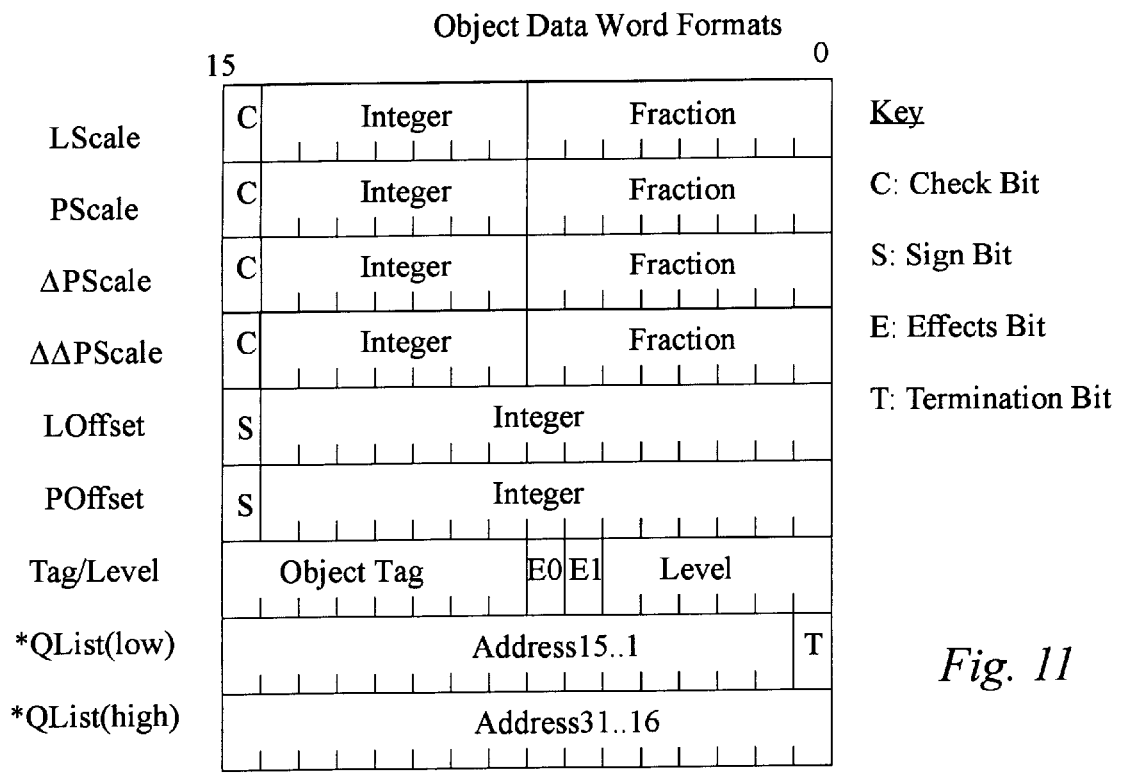
FIGS. 11 and 12 show the object and QPF data word formats of the list of FIG. 10.
Figure 12:
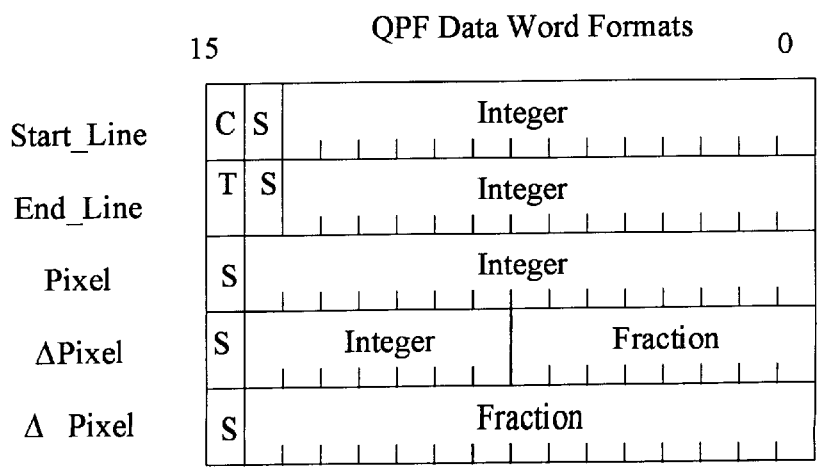

The data types of the different object and QPF components are indicated and their precise formats are shown in FIGS. 11 and 12. In addition to the image data, some of the object and QPF components contain check bits and termination bits.

Check bits occupy the top bit of the four scale factors (LScale, PScale, ΔPScale, ΔΔPScale) in an object description and the START_LINE component of a QPF description. In the object list, the check bits must be set to zero. In the START_LINE field, the check bit must be the same as the sign bit. If any of these bits are incorrect, the RTO processor 13 will detect this and abort the image generation.

The bottom bit of the *QList(low) word of each object is used as a termination marker for the object list. This bit is set to a 1 for the final object in the list only. The top bit of the end line word of each QPF is used as a termination marker for the QPF list. For all QPFs except the last, it must be the same as the end line sign bit. For the last QPF, it must be the opposite of the sign bit.

The formating provided by FIGS. 10, 11 and 12 permit the RTO processor 13 to successfully read QPFs for an image and to manipulate those within the preprocessing pipeline 22. After preprocessing, it is necessary for the QPFs to be stored in the memory 14, by which access is obtained using the memory interface 27 of FIG. 9.

Figure 13:
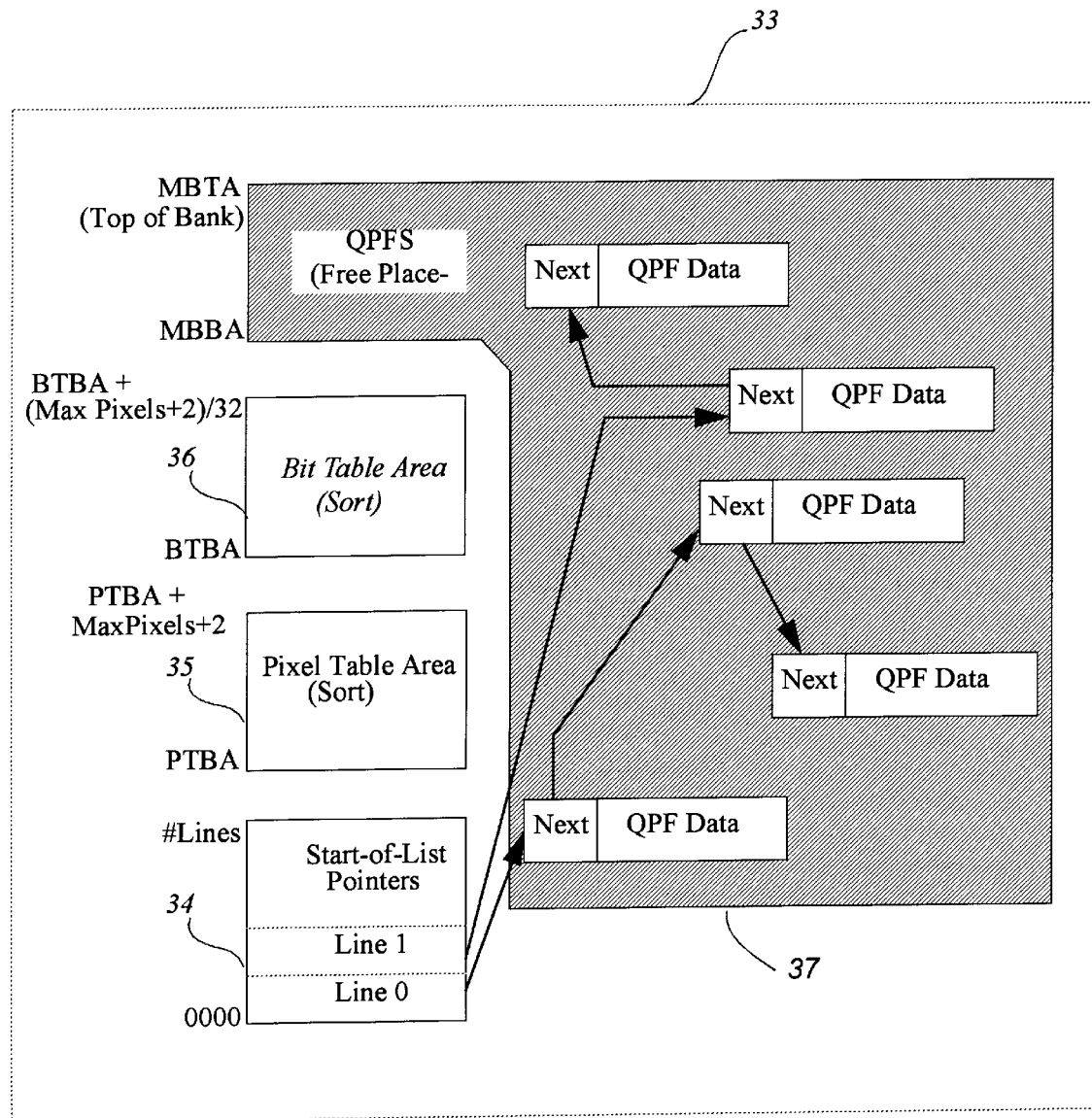
FIG. 13 illustrates the organisation of the QPF memory of FIGS. 8 and 9.

The QPF memory 14 is organised in the manner shown in FIG. 13. FIG. 13 shows one bank 33 of QPF memory 14 and if more than one bank is used, each bank is organised in an identical fashion. The bank 33 is divided into four areas comprising a line table 34, and pixel table 35, a bit table 36, and a QPF area 37. The line table 34, which contains one word for each line of the display, is used for storing the start of line pointers and always occupies the bottom of the QPF memory 14. The pixel table 35 is a temporary storage area used for the sorting of pixels carried out by the sort unit 28. The base location is set by a register PTBA, and the size is one word for each pixel displayed in a line, plus two additional words. The bit table 36 is another temporary storage area used in the pixel sort. Base location is set by a register PTBA, and the size of the bit table 36 is the size of the pixel table 35 divided by 32, and rounded up to the nearest whole word. The QPF area 37 contains all of the QPF data. This always occupies the top of the QPF memory 14 in which the bottom address is set by a register QRBA, while the top address, which is also the top address of the bank 33, is set by a register MBTA.

Figure 14:
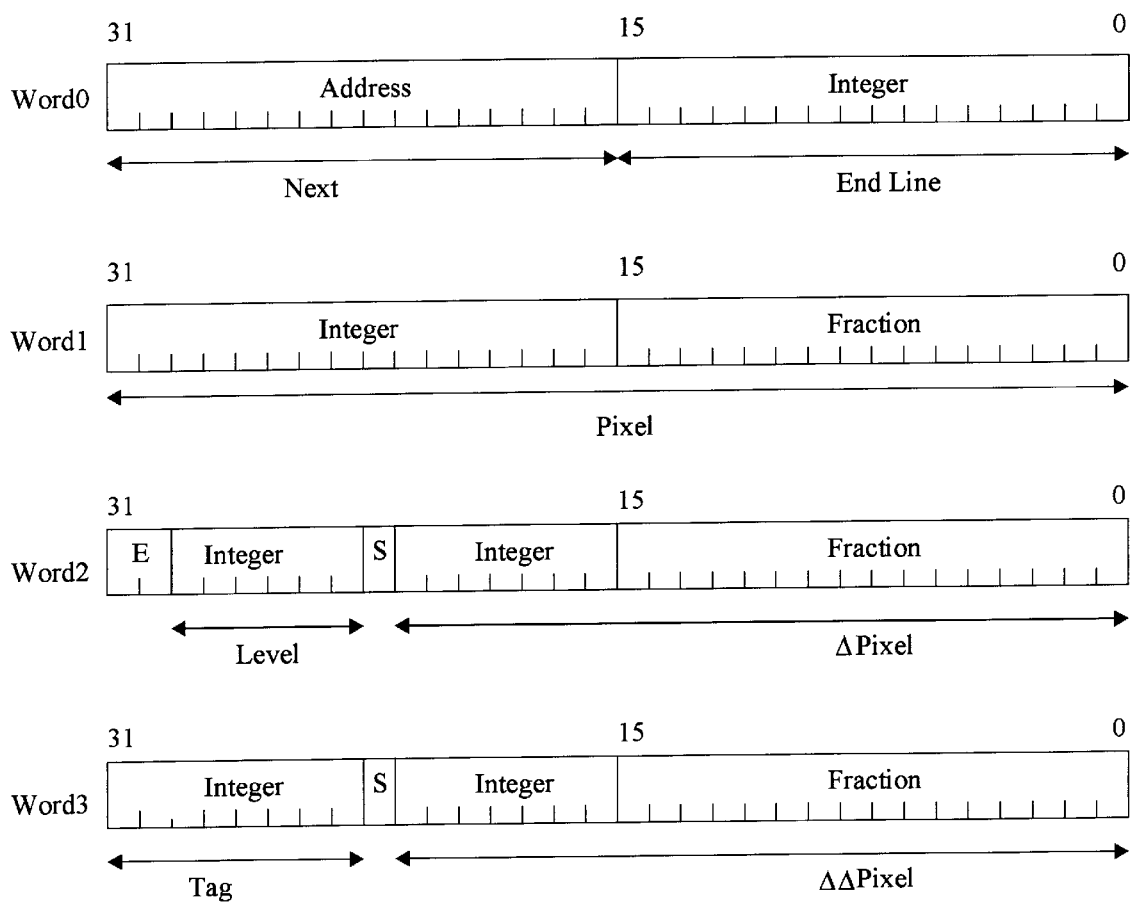
FIG. 14 shows the data format of a single QPF in the QPF memory of FIGS. 8 and 9.

The format of the QPF components stored in the memory bank 33 are indicated in FIG. 14. In the preprocessing pipeline 22, the object scale and offset factors have been applied to each QPF, resulting in PIXEL, ΔPIXEL and ΔΔPIXEL values having greater range and/or precision compared to their original formats in the processor memory 12. Also, the object level, effects and tag bits have been merged in and stored with each QPF. The start line field need no longer be stored with the QPF, as the QPF lists are based on the start line. There are no check bits, and the end of each linked list is denoted by a zero pointer.

This structure is seen in FIG. 13 wherein the QPF area 37 there are shown two linked lists for lines zero and one of the image. The linked list for line zero commences with a QPF 40 which points to a QPF 41 which in turn points to a QPF 42 at the end of the list. The linked list for line 1 of the image commences with a QPF 43 which points to a terminal QPF 44.

The actual formation and calculation of QPF data can now be described by example using a simple object.

FIG. 15 shows an object of letter "B" shape. This object can be represented by QPF's in the manner shown in FIG. 16.

FIG. 17 shows a Bezier object for the letter "B" which can be transformed to a QPF object using the method disclosed in patent application Ser. No. 08/053,213, U.S. Pat. No. 5,422,990.

In FIG. 18, a specific Bezier curve of the object of FIG. 17 is shown, in 4-point format. This is transformed into two QPF's as shown in FIG. 19.

The foregoing describes only one embodiment of the present invention and modifications, obvious to those skilled in the art, can be made thereto without departing from the scope of the present invention.

We claim:

1. A computerized object-based graphics reproduction apparatus, comprising:

a display device having a predetermined output area; and rasterization means, coupled to said display device, for processing signals defining an outline of a graphic object on a scanline basis to generate data for use in displaying an image of the graphic object in the predetermined output area, said rasterization means being adapted to process the outline as a plurality of curve fragments in which each curve fragment is defined by a quadratic polynomial having a constant rate of change of slope with regard to a fixed scanning direction of said rasterization means, and said rasterization means comprising (a) means for determining, for each curve fragment, the slope of the corresponding quadratic polynomial at a current scanline using the corresponding constant rate of change of slope and the slope of the corresponding quadratic polynomial at the previous scanline, and (b) means for determining, for each curve fragment, a pixel location of the curve fragment on a scanline using the current slope of the corresponding quadratic polynomial and the pixel location of the curve fragment on the previous scanline, wherein the number of pixels between the pixel locations of the same curve fragment on a previous scanline and a next scanline varies as the corresponding slope of the quadratic polynomial at the current scanline.

2. A computerized object-based reproduction apparatus according to claim 1, wherein said rasterization means is adapted to process the curve fragments to produce data for use in rasterized display of the image on said display device, said display device having a plurality of scanlines upon each of which a plurality of pixels are reproducible, and wherein when a first intersection between the outline and one of said scanlines is known, said rasterization means is adapted to calculate each subsequent intersection between the outline and other ones of the scanlines using two mathematical operations.

3. A computerized object-based graphics reproduction apparatus according to claim 2, wherein the two mathematical operations comprise additions.

4. A computerized object-based graphics reproduction apparatus according to claim 3, wherein each curve fragment is defined by a commencing pixel location value (START_PIXEL), a slope value ($\Delta$PIXEL) in the fixed scanning direction of said rasterization means, a change-of-slope value ($\Delta\Delta$PIXEL), a commencing scanline value (START_LINE), and a finishing scanline value (END_LINE), and wherein said rasterization means is adapted to determine a pixel location of a curve fragment of any scanline ($line_{n+1}$) of a rasterized image by evaluating:

PIXEL ($line_{n+1}$)=PIXEL ($line_n$)+$\Delta$PIXEL ($line_n$)

$\Delta$PIXEL ($line_{n+1}$)=$\Delta$PIXEL ($line_n$)+$\Delta\Delta$PIXEL where
PIXEL ($line_{n=START\_LINE}$)=START_PIXEL; and
$\Delta$PIXEL ($line_{n=START\_LINE}$)=$\Delta$PIXEL.

5. A computerized object-based graphics reproduction apparatus according to claim 2, wherein the two mathematical operations comprise only two addition operations.

6. A computerized object-based graphics reproduction apparatus according to claim 1, wherein each curve fragment is defined by an explicit quadratic polynomial determined from a spline fragment.

7. A computerized object-based graphics reproduction apparatus according to claim 1, wherein said rasterization means is adapted to process each curve fragment in accordance with one of (a) a scaling factor, (b) a translation factor, and (c) a scaling factor and a translation factor.

8. A computerized object-based graphics reproduction apparatus according to claim 1, wherein said rasterization means is adapted to process each curve fragment in accordance with a color level value and offset information.

9. A method for reproducing a graphics object displayable on a display device using a computerized object-based computer graphics reproduction apparatus, the graphics object having an outline and the display device having a single output area, said method comprising the steps of:

dividing the outline of the graphic object into a plurality of curve fragments to define the outline of the graphic object on a scanline basis to generate data for use in displaying an image of the graphic object;

representing each of the plurality of curve fragments by at least one corresponding quadratic polynomial reproducible in the single output area; and rastering, using the computerized object-based computer graphics reproduction apparatus, each curve fragment into the single output area using the corresponding quadratic polynomial having a constant rate of change of slope with regard to a fixed scanning direction of the reproduction apparatus, wherein said rastering step comprises (a) determining, for each curve fragment, the slope of the corresponding quadratic polynomial at a current scanline using the corresponding constant rate of change of slope and the slope of the corresponding quadratic polynomial at the previous scanline, and (b) determining for each curve fragment, a pixel location of the curve fragment on a scanline using the current slope of the corresponding quadratic polynomial and the pixel location of the curve fragment on the previous scanline, and wherein the number of Pixels between the pixel locations of the same curve fragment on a previous scanline and a next scanline varies as the corresponding slope of the quadratic polynomial at the current scanline.

10. The method according to claim 9, wherein:

the curve fragments are processed in said rastering step to produce data for use in rasterized display of the image on the display device, the display device having a plurality of scanlines upon each of which a plurality of pixels are reproducible, and wherein when a first intersection between the outline and one of said scanlines is known, each subsequent intersection between the outline and other ones of the scanline is calculated in said rastering step using two mathematical operations.

11. The method according to claim 10, wherein the two mathematical operations comprise additions.

12. The method according to claim 11, wherein:

each curve fragment is defined by a commencing pixel location value (START_PIXEL), a slope value ($\Delta$PIXEL), a change-of-slope value ($\Delta\Delta$PIXEL) in the fixed scanning direction, a commencing scanline value (START_LINE), and a finishing scanline value (END_LINE), and wherein a pixel location of a curve fragment on any scanline ($line_{n+1}$) of a rasterized image is determined in said rastering step by evaluating:

PIXEL ($line_{n+1}$)=PIXEL ($line_n$)+$\Delta$PIXEL ($line_n$)

$\Delta$PIXEL ($line_{n+1}$)=$\Delta$PIXEL ($line_n$)+$\Delta\Delta$PIXEL where
PIXEL ($line_{n=START\_LINE}$)=START_PIXEL; and
$\Delta$PIXEL ($line_{n=START\_LINE}$)=$\Delta$PIXEL.

13. The method according to claim 9, wherein each curve fragment is processed in accordance with one of (a) a scaling factor, (b) a translation factor, and (c) a scanline factor and a translation factor.

14. The method according to claim 9, further comprising the step of displaying an image of the object using the generated data from said rastering step.

15. An object based computerized graphics system for reproducing an image on a display device having a plurality of scanlines upon each of which a plurality of pixels are reproducible, said system comprising:

information-providing means for providing graphic object information for at least one graphic object intended for reproduction, the graphic object information comprising an outline representation of the graphic object, the outline representation being formed from at least two curve fragments; and rasterization means for rastering the at least one graphic object and being adapted to process the curve fragments in which each curve fragment is defined by a quadratic polynomial having a constant rate of change of slope with regard to a fixed scanning direction of said rasterization means, said rasterization means being configured to determine, for each curve fragment, given a first intersection between each curve fragment and a scanline of the display device, and using the corresponding rate of change of slope, each subsequent intersection between each curve fragment and other ones of the scanlines, wherein the number of pixels between the pixel locations of the same curve fragment on a previous scanline and a next scanline varies as the corresponding slope of the quadratic polynomial at the current scanline.

16. An object-based computerized graphics system according to claim 15, wherein said rasterization means determines each subsequent intersection using addition operations.

17. An object-based computerized graphics system according to claim 16, wherein each curve fragment is defined by a commencing pixel location value (START_PIXEL), an initial slope value ($\Delta$PIXEL) in the fixed scanning direction of said rasterization means, a change-of-slope value ($\Delta\Delta$PIXEL), a commencing scanline value (START_LINE), a finishing scanline value (END_LINE), and wherein said rasterization means is adapted to determine a pixel location (PIXEL (line$_{n+1}$)) of a curve fragment on any scan line$_{(n+1)}$ of the rasterized image by evaluating:

PIXEL (line$_{n+1}$)=PIXEL (line$_n$)+$\Delta$PIXEL (line$_n$)

$\Delta$PIXEL (line$_{n+1}$)=$\Delta$PIXEL (line$_n$)+$\Delta\Delta$PIXEL where

PIXEL (line$_n$=START_LINE)=START_PIXEL; and $\Delta$PIXEL (line$_n$=START_LINE)=$\Delta$PIXEL.

18. An object-based computerized graphics system according to claim 15, wherein said rasterization means determines each subsequent intersection using only two addition operations.

19. A computerized object-based graphics reproduction apparatus, comprising:

a display device having a predetermined output area;

receiving means for receiving data related to graphic objects, the data defining an image to be displayed on said display device; and rasterization means, coupled to said display device, for processing signals defining an outline of a graphic object on a scanline basis to generate data for use in displaying an image of the graphic object in the predetermined output area, said rasterization means being adapted to process the outline as a plurality of curve fragments in which each curve fragment is defined by a quadratic polynomial having a constant rate of change of slope with regard to a fixed scanning direction of said rasterization means, and said rasterization means comprises (a) means for determining, for each curve fragment, the slope of the corresponding quadratic polynomial at a current scanline using the corresponding constant rate of change of slope and the slope of the corresponding quadratic polynomial at the previous scanline, and (b) means for determining, for each curve fragment, a pixel location of the curve fragment on a scanline using the current slope of the corresponding quadratic polynomial and the pixel location of the curve fragment on the previous scanline, and wherein the number of pixels between the pixel locations of the same curve fragment on a previous scanline and a next scanline varies as the corresponding slope of the quadratic polynomial at the current scanline.

20. An apparatus according to claim 19, wherein said receiving means and said rasterization means are included within a graphic object processor.

21. An apparatus according to claim 19, wherein the image is intended for rasterized reproduction on said display device, said display device having a plurality of the scanlines within each of which a plurality of pixels are reproducible, and wherein when a first intersection, between the outline and one of the scanlines is known, said rasterization means calculates each subsequent intersection between the outline and other ones of the scanlines using two mathematical operations.

22. An apparatus according to claim 17, wherein the two mathematical operations comprise additions.

23. An apparatus according to claim 22, wherein each curve fragment is defined by a commencing pixel location value (START_PIXEL), a slope value ($\Delta$PIXEL), a change-of-slope value ($\Delta\Delta$PIXEL) in the fixed scanning direction of the rasterization means, a commencing scanline value (START_LINE), and a finishing scanline value (END_LINE), and wherein said rasterization means is adapted to determine a pixel location of a curve fragment on any scanline (line$_{n+1}$) of a rasterized image by said rasterization means evaluating:

PIXEL (line$_{n+1}$)=PIXEL (line$_n$)+$\Delta$PIXEL (line$_n$)

$\Delta$PIXEL (line$_{n+1}$)=$\Delta$PIXEL (line$_n$)+$\Delta\Delta$PIXEL where

PIXEL (line$_n$=START_LINE)=START_PIXEL; and $\Delta$PIXEL (line$_n$=START_LINE)=$\Delta$PIXEL.

24. A computer program product having a computer readable medium having a computer program recorded thereon for producing a graphics object displayable on a display device using a computerized object-based computer graphics reproduction apparatus, the graphics object having an outline and the display device having a single output area, said computer program product comprising:

means for dividing the outline of the graphic object into a plurality of curve fragments to define the outline of the graphics object on a scanline basis to generate data for use in displaying an image of the graphic object;

means for representing each of the plurality of curve fragments by at least one corresponding quadratic polynomial reproducible in the single output area; and means for rasterization, using the computerized object-based computer graphics reproduction apparatus each curve fragment into the single output area using the corresponding quadratic polynomial, the polynomial having a constant rate of change of slope with regard to a fixed scanning direction of the reproduction apparatus, and wherein said rasterization means comprises (a) means for determining, for each curve fragment, the slope of the corresponding quadratic polynomial at a current scanline using the corresponding constant rate of change of slope and the slope of the corresponding quadratic polynomial at the previous scanline, and (b) means for determining, for each curve fragment, a pixel location of the curve fragment on a scanline using the current slope of the corresponding quadratic polynomial and the pixel location of the curve fragment on the Previous scanline, and wherein the number of pixels between the pixel locations of the same curve fragment on a previous scanline and a next scanline varies as the corresponding slope of the quadratic polynomial at the current scanline.

25. The computer program product according to claim 24, wherein:

the curve fragments are processed by said rasterization means to produce data for use in rasterized display of the image on the display device, the display device having a plurality of scanlines upon each of which a plurality of pixels are reproducible, and wherein when a first intersection between the outline and one of said scanlines is known, each subsequent intersection between the outline and other ones of the scanlines is calculated by said rasterization means using two mathematical operations.

26. The computer program product according to claim 25, wherein the two mathematical operations comprise additions.

27. The computer program product according to claim 26, wherein each curve fragment is defined by a commencing pixel location value (START_PIXEL), a slope value ($\Delta$PIXEL), a change-of-slope value ($\Delta\Delta$PIXEL) in the fixed scanning direction, a commencing scanline value (START_LINE), and a finishing scanline value (END_LINE), and wherein said rasterization means comprises means for determining a pixel location of a curve fragment on any scanline ($line_{n+1}$) of a rasterized image by evaluating:

$$PIXEL\ (line_{n+1}) = PIXEL\ (line_n) + \Delta PIXEL\ (line_n)$$

$$\Delta PIXEL\ (line_{n+1}) = \Delta PIXEL\ (line_n) + \Delta\Delta PIXEL$$

where $PIXEL\ (line_{n=START\_LINE}) = START\_PIXEL$; and $\Delta PIXEL\ (line_{n=START\_LINE}) = \Delta PIXEL$.

28. The computer program product according to claim 24, wherein each curve fragment is processed in accordance with one of (a) a scaling factor, (b) a translation factor, and (c) a scanline factor and a translation factor.

29. The computer program product according to claim 24, further comprising means for displaying an image of the object using the generated data from said rasterization means.

* * * * *

UNITED STATES PATENT AND TRADEMARK OFFICE
CERTIFICATE OF CORRECTION

PATENT NO. : 6,124,863

DATED : September 26, 2000

INVENTOR(S) : KIA SILVERBROOK, et al.

It is certified that error appears in the above-identified patent and that said Letters Patent is hereby corrected as shown below:

COVER PAGE

Under [56] References Cited, Other Publications, "Foldy" should read --Foley--.

Under [57] Abstract, line 15, "determines" should read --determine,--.

COLUMN 2

Line 37, "shows" should read --show--.

COLUMN 3

Line 29, "patent application" should read --Patent Application--.

UNITED STATES PATENT AND TRADEMARK OFFICE
CERTIFICATE OF CORRECTION

PATENT NO. : 6,124,863
DATED : September 26, 2000
INVENTOR(S) : KIA SILVERBROOK, et al.

It is certified that error appears in the above-identified patent and that said Letters Patent is hereby corrected as shown below:

COLUMN 6

Line 44, "patent application" should read --U.S. Patent Application--.

COLUMN 8

Line 22, "Pixels" should read --pixels--.

COLUMN 11

Line 10, "Previous" should read --previous--.

Signed and Sealed this

Twenty-second Day of May, 2001

*Attest:*

NICHOLAS P. GODICI

*Attesting Officer*   Acting Director of the United States Patent and Trademark Office